No. 789,157.

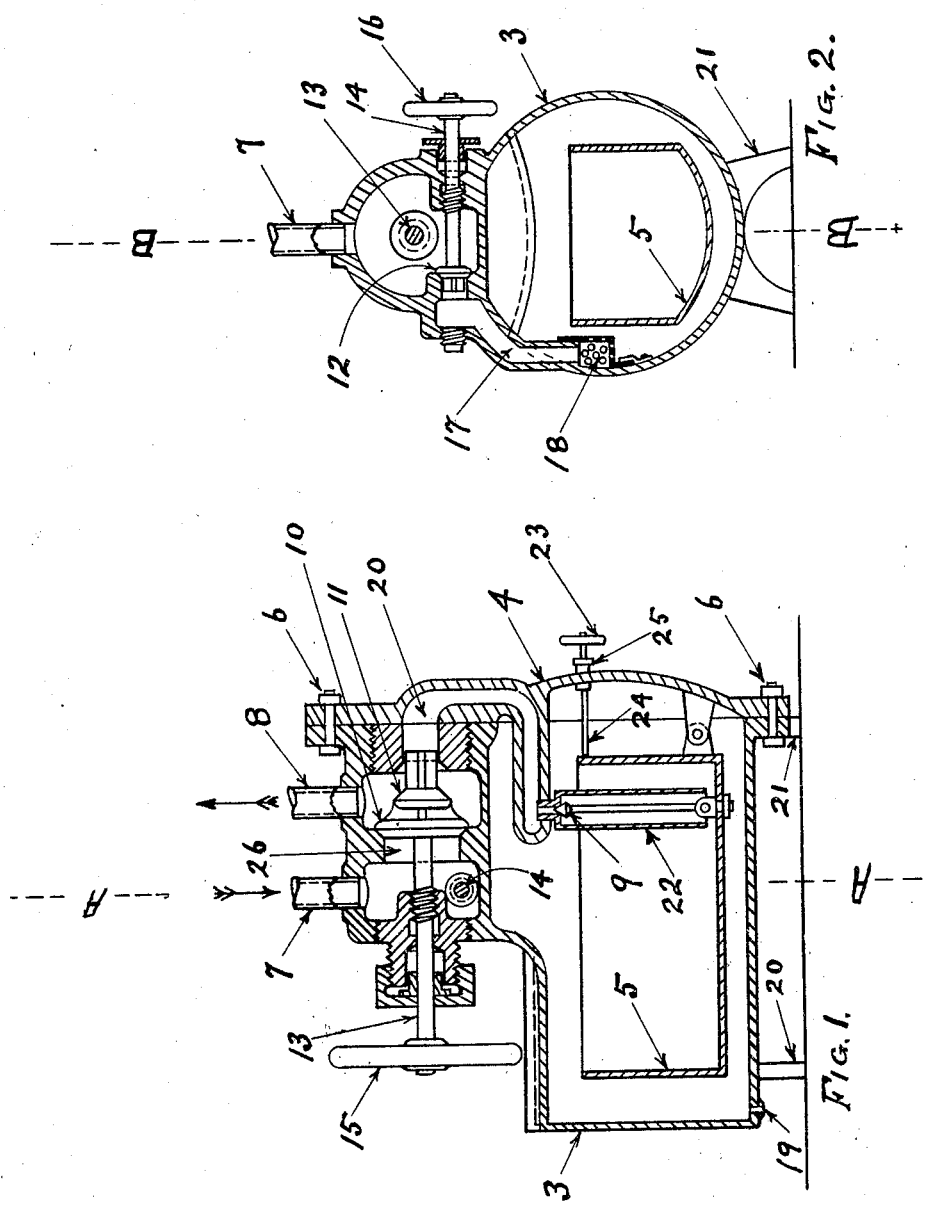

Patented May 9, 1905.

UNITED STATES PATENT OFFICE.

ROBERT D. KINNEY, OF PHILADELPHIA, PENNSYLVANIA.

STEAM-TRAP.

SPECIFICATION forming part of Letters Patent No. 789,157, dated May 9, 1905.

Application filed August 26, 1904. Serial No. 222,338.

*To all whom it may concern:*

Be it known that I, ROBERT D. KINNEY, a citizen of the United States, residing in the city and county of Philadelphia and State of Pennsylvania, have invented certain new and useful Improvements in Steam-Traps, of which the following is a specification, reference being had to the accompanying drawings.

My invention relates to devices for removing the water or liquid of condensation, &c., from pipes and chambers containing steam or other gases under pressure without the loss of such steam or gas, and has for its object the providing of a complete, compact, and efficient trap that will enable the inspection, cleaning, and repairing of its operating parts without interfering with the removing flow of the condensed liquid while so doing, as also without the detaching of the trap from the pipes or chamber to which it is connected.

Further advantages of my said invention will more fully appear in the following description and claims and by reference to the accompanying drawings, all of which will be readily understood by those skilled in the art to which the invention appertains.

Referring to the drawings, Figure 1 represents a vertical section of my trap, taken at the line B B of Fig. 2. Fig. 2 represents a like section at the line A A of Fig. 1.

Similar reference characters indicate like parts in the different views shown.

3 represents the main body or inclosing casing of the trap, and 4 a removable section thereof secured thereto by means of bolts and nuts 6. The main body 3 is supported by suitable legs 20 and 21 and is made of any suitable material.

5 represents the bucket-float, and 9 the valve operated thereby, and which working parts of the trap are attached to the removable section 4 of the inclosing casing, as shown in Fig. 1 of the drawings.

The inlet-pipe leading to the trap is indicated by 7, and the outlet-pipe leading from the trap is indicated by 8. Both of these pipes are connected by screw-threads or in other usual manner employed in the making of connections of this kind.

In the conduit-passages of the trap are located stop-valves 10, 11, and 12. The valves 10 and 11 are both fixed to and operated by one common stem, 13, as shown. The valve 12 is operated by the stem 14. The stems 13 and 14 are preferably provided with hand-wheels 15 and 16, respectively, for convenience in opening and closing the valves in connection therewith. These valve-stems are packed in the usual manner for the purpose of making them steam and water tight at the pressure under which the trap is employed.

The port or conduit-passage 17 is a continuation of the inlet-conduit to the trap and may be provided with a strainer 18, if desired. The port or conduit-passage 20 is a part of the outlet-conduit of the trap and is located part in the main body 3 and part in the removable section 4 thereof, as shown in Fig. 1 of the drawings.

22 is the usual pipe for conducting the water or other liquid to the valve 9 by way of the bottom of the bucket-float 5.

A blow-off outlet or drain to the main chamber of the trap may be provided, as shown at 19, if desired. There may also be provided a hand-wheel 23, attached to the rod 24, which is actuated longitudinally by means of a section thereof being engaged by screw-threads to and passing through the stuffing-box 25 for depressing the bucket-float 5, and thereby opening the valve 9 without having to await the action of the filling of the bucket-float 5 (by which action it is operated when the trap is in use, as hereinafter described) for blowing out of dirt from the bucket-float 5, clearing the valves, piping, &c., in case of their becoming clogged while in operation.

The operation of my said invention can now be readily understood. Water or other liquid which is it desired to remove from pipes and chambers under steam or other gaseous pressure is caused to collect and flow into the trap through the inlet-pipe 7, the valves 11 and 12 both being open, while valve 10 is closed. The water or other liquid is thus allowed to flow through valve 12 and on through the port 17 into the chamber containing the bucket-float 5, causing the bucket-float 5 to rise, and thereby close valve 9. As the water or other liquid continues to enter the trap it will overflow into the bucket-float 5 and finally by filling it cause it to sink, and thereby opening the valve 9, when the force of the steam or gas by its pressure will cause the water or other liquid contained in the bucket-float 5 to pass up the pipe 22, on out through the valve 9 and port 20, and on through the discharge-outlet 8 from the trap, the flow continuing until the bucket-float 5 is again floated by its buoyancy in the surrounding water or liquid, thus closing the valve 9 until the bucket-float again fills, when the same cycle of operations will be repeated.

When it is desired to inspect, clean, or repair the working parts of the trap without interrupting the flow of the water or other liquid being removed from the pipes or chambers to which the trap is connected, the valve 10 is opened and the valves 11 and 12 are closed, thus causing the water or liquid of condensation, &c., to by-pass the trap through the opening 26, located in the interior walls of the casing 3 of the trap, thus giving direct communication between the inlet and outlet pipes 7 and 8, respectively, by the opening of the valve 10. The removable section 4 of the trap-inclosing casing can then be unbolted and the bucket-float 5 and other working parts of the trap removed therefrom and conveniently examined, cleaned, and repaired without interrupting the flow of the water or other liquid then being removed from the pipes or chambers to which the trap is connected, as also without disconnecting the trap from the system to which it is connected, as also without the employment of a separate system of by-pass pipes and valves heretofore usually employed for such purposes.

It is obvious that the object of removing the working parts of my trap for purposes of cleaning and repair can be accomplished by omitting in the construction the by-pass opening 26 and in lieu thereof make a solid wall between the inlet and outlet chambers, forming same integral with the main body or casing 3 of the trap, and locating the by-pass and stop valves in the piping to which the trap is connected; but I prefer locating those valves so that their inclosing walls are formed integral with the trap-casing or main body, as shown on the drawings herewith.

Having thus described my said invention, what I claim as new, and desire to secure by Letters Patent, is—

1. A drain-trap provided with a valved by-pass opening 26, formed integral with the main body or casing 3 of the trap, and a drain-inlet stop-valve 12, and a discharge-outlet stop-valve 11, the inclosing walls of said stop-valves being formed integral with the walls of said by-pass opening; substantially as and for the purposes shown and described.

2. A drain-trap provided with a valved by-pass opening 26, formed integral with the main body or casing 3 of the trap, and a drain-inlet stop-valve 12, and a discharge-outlet stop-valve 11, the inclosing walls of said stop-valves being formed integral with the walls of said by-pass opening; in combination with a discharge-regulating valve 9, said regulating-valve being actuated by a float 5, and discharging into a conduit 20 formed integral with a removable section 4 of the trap-casing, said float and also the discharge-regulating valve being connected to and removable from the trap with said section 4; all substantially as and for the purposes shown and described.

3. A drain-trap provided with a drain-inlet 7, and discharge-outlet 8, and having a closed or solid wall between the same, the whole formed integral with the main body or casing 3 of the trap; in combination with a discharge-regulating valve 9, said valve being actuated by a float 5 and discharging into a conduit 20 formed integral with a removable section 4 of the trap-casing, said float and also the discharge-regulating valve being connected to and removable from the trap with said section 4; all substantially as and for the purposes shown and described.

In testimony whereof I hereto affix my signature in the presence of two witnesses.

ROBT. D. KINNEY.

Witnesses:
W. R. WOOTERS,
CLARA A. WOOTERS.